US005979423A

United States Patent [19]

Poindexter et al.

[11] Patent Number: 5,979,423

[45] Date of Patent: Nov. 9, 1999

[54] FIBER-OPTIC GAS COMPOSITION SENSOR FOR EXHAUST GASES

[75] Inventors: Bennie Poindexter, Westland; Jeffrey Thomas Remillard, Ypsilanti; Willes Henry Weber, Ann Arbor, all of Mich.

[73] Assignee: Ford Global Technologies, Inc., Dearborn, Mich.

[21] Appl. No.: 09/087,070

[22] Filed: May 29, 1998

[51] Int. Cl.[6] ............................ F02D 41/14; G01N 30/74

[52] U.S. Cl. ......................... 123/697; 123/703; 73/23.32; 422/91; 356/318

[58] Field of Search .................................... 123/697, 703; 73/23.31, 23.32, 31.05, 31.06; 422/91; 356/306, 317, 318

[56] References Cited

U.S. PATENT DOCUMENTS

| | | | |
|---|---|---|---|
| 5,490,490 | 2/1996 | Weber et al. | 123/697 |
| 5,591,407 | 1/1997 | Groger et al. | 422/82.05 |

OTHER PUBLICATIONS

Distributed and Multiplexed Fiber Optic Sensors V, SPIE, vol. 2507, pp. 13–24, Nellen et al, Jun. 1995.

Formation of Bragg gratings in optical fibers by a transverse holographic method, Meltz et al, Optics Letters, Aug. 1, 1989, vol. 14, No. 15, pp. 823–825.

Fiber Optic Sensors, John Wiley & Sons, Inc., A Wiley–Interscience Publication, pp. 31–33.

*Primary Examiner*—Andrew M. Dolinar
*Attorney, Agent, or Firm*—Donald A. Wilkinson

[57] ABSTRACT

An on-board gas composition sensor is disclosed for monitoring oxygen content levels in the exhaust gas (24) of an internal combustion engine (4). The gas composition sensor includes a sensor body (20) mounted inan exhaust stream from an engine (4), with a fiber-optic cable (18) running from the sensor body (20) to a silicon chip (13) containing a sensor assembly(10). The sensor assembly (10) includes a light source (12), mounted on the chip (13), for generating excitation light. Also, a fiber-optic coupler (16), formed in the chip, operatively engages a second fiber-optic cable (15), mounted in a groove on the chip. The second cable (15) connects to a fluorescence detector (34) and an excitation detector (36). The two detectors produce output signals (35, 37) that are used by the electronic engine control (8) to adjust engine operation.

20 Claims, 1 Drawing Sheet

FIBER-OPTIC GAS COMPOSITION SENSOR FOR EXHAUST GASES

FIELD OF THE INVENTION

The present invention relates to an on-board gas composition sensor for monitoring oxygen content levels in the exhaust gas from an internal combustion engine. More particularly, the invention is directed to such a sensor employing fiber-optics on a micro-machined chip.

BACKGROUND OF THE INVENTION

Vehicles today are required to meet strict emission requirements, and consequently require catalytic converters and advanced engine controls to minimize any potentially harmful emissions flowing from the exhaust created by an internal combustion engine. In order to control the engine and monitor its performance, on-board gas sensors are used to continuously monitor the exhaust gases as they flow from the engine. Sensors employed for this use must withstand the greatly varying temperatures, different gases to which the sensor is exposed, vibration, moisture, etc., as is generally created in an environment around a vehicle engine. Therefore, maintaining the integrity and accuracy of the sensor is difficult over long periods of time. Further, the size and weight requirements for the sensor may be limited due to limitations on the vehicle.

U.S. Pat. No. 5,490,490 to Weber et al., incorporated herein by reference, describes an on-board gas composition sensor for analyzing internal combustion engine exhaust gases. The device employs a light source that excites a fluorescence in an inorganic-oxide ceramic sensor body exposed to gases in the engine exhaust stream. The intensity of that fluorescence is related to either the oxygen concentration or reductant to oxidant ratio of the exhaust gas. While this sensor works well for this purpose, a smaller, and lighter assembly is desirable due to the continued emphasis on lighter and smaller vehicles in order to improve fuel economy. Also, it is desirable to have a more robust sensor that assures proper alignment and operation of the sensor assembly components for the life of the sensor, assuring better reliability. Further, it is desirable to have a more cost effective way to implement this type of sensor.

SUMMARY OF THE INVENTION

In its embodiments, the present invention contemplates an on-board gas composition sensor for an internal combustion engine, for monitoring oxygen content in an exhaust gas stream from the internal combustion engine. The gas composition sensor includes a sensor body adapted for placement in an exhaust stream, and a substrate material having first and second fiber-optic mounting grooves, with the grooves formed adjacent one another at a predetermined location on the substrate to form a fiber-optic coupler. a light source is mounted on the substrate for generating light. A first fiber-optic cable has a first portion extending between the light source and the fiber-optic coupler and a second portion extending between the sensor body and the fiber optic coupler, with the first portion and a segment of the second portion mounted in the first groove. A fluorescence detector is mounted on the substrate proximate the light source and the fiber-optic coupler, and has a first signal output means. A second fiber-optic cable has a first portion extending between the fiber-optic coupler and the fluorescence detector. An excitation detector is mounted on the substrate proximate the fiber-optic coupler, and has a second signal output means, with a second portion of the second fiber-optic cable extending between the fiber-optic coupler and the excitation detector. And the sensor includes filter means, operatively engaging the first portion of the second cable, for filtering out light generated by the light source.

Accordingly, an object of the present invention is to employ micro-machining and other chip technology to create an oxygen sensor assembly on a chip that will detect oxygen concentrations in an exhaust stream with a fluorescence based sensor.

An advantage of the present invention is the compact size and light weight of the sensor assembly, allowing for oxygen concentration detection for a vehicle engine while taking up a minimal amount of space.

An additional advantage is that the components are all formed on the same substrate, ensuring that they will remain properly aligned during the lifetime of the sensor, thus improving long term reliability of the sensor.

Another advantage is the employment of a Bragg grating in front of the fluorescence detector. The Bragg grating simplifies the sensor design by allowing it to be formed integral with one of the fiber optic cables, thus eliminating the need for a separate optical filter.

DETAILED DESCRIPTION OF THE PREFERRED EMBODIMENTS

Figure 1:
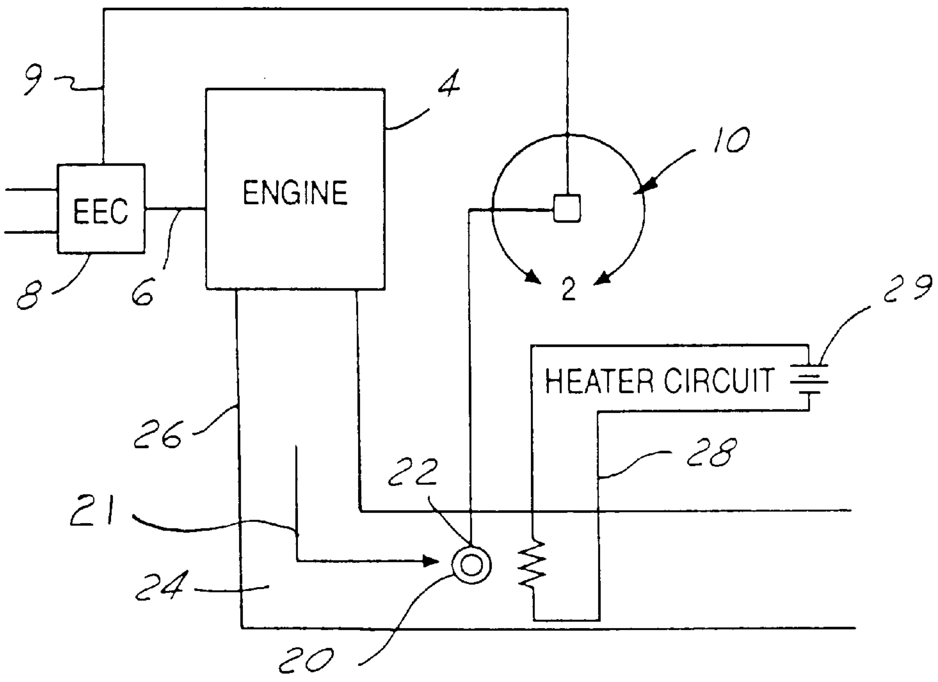
FIG. 1 schematically illustrates an embodiment of an on-board gas composition sensor for monitoring oxygen content levels in the exhaust gas from an internal combustion engine.
Figure 2:
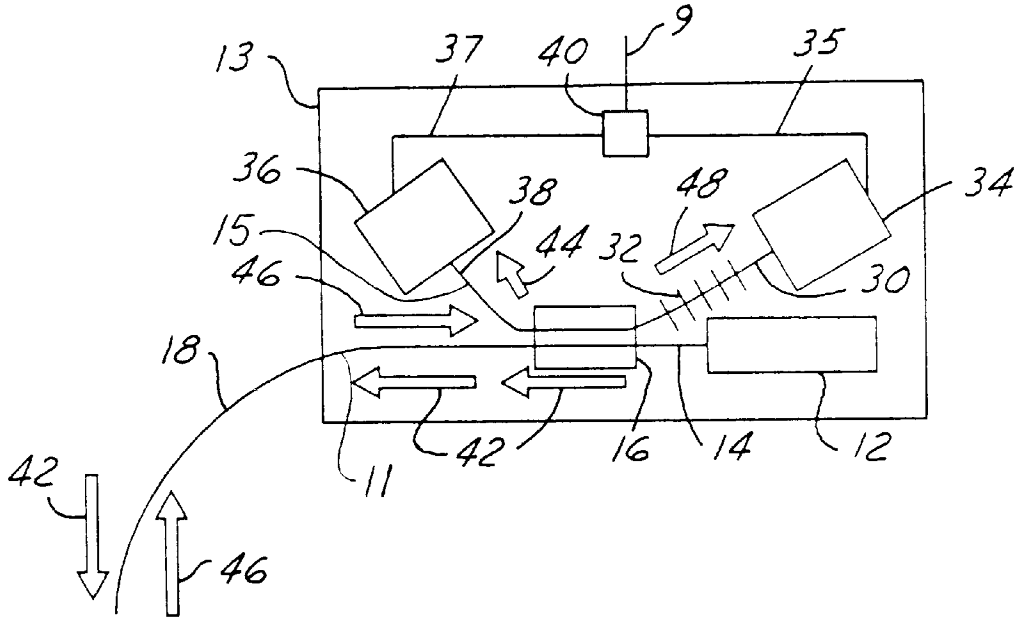
FIG. 2 is an enlarged view of encircled area 2 in FIG. 1.

FIGS. 1 and 2 show schematic representations of the present invention wherein the air/fuel ratio fed to an internal combustion engine 4 is controlled by an air/fuel signal 6 generated by an electronic engine control (EEC) module 8, based on various input signals, including an oxygen sensor signal 9 from an oxygen sensor assembly 10.

The oxygen sensor assembly includes a portion micromachined on a substrate 13, preferably silicon. The size of this substrate for the sensor, for example, is about a square centimeter; just large enough to make fiber optic connections conveniently. This allows for minimal size and weight. The substrate 13 includes a pair of grooves within which a first fiber-optic cable 11 (excitation cable) and a second fiber-optic cable 15 (detector cable) are mounted by pressing the fibers into the grooves. A fiber optic coupler 16 is created on the chip 13 by etching the grooves for the two fiber-optic cables 11, 15 close enough together at the desired location on the chip 13 that they will naturally have evanescent coupling between them. In this way, no separate component is needed to couple the cables 11, 15, reducing complexity and assuring the reliability of the alignment of the fiber-optic cables.

There is a light source 12, for example a laser diode or a light emitting diode, bonded to the chip 13 by soldering or other similar techniques, aligned with a first portion 14 of the first fiber-optic cable 11. This first portion 14 extends between the light source 12 and the fiber-optic coupler 16. This light source 12 generates excitation light, for example, in the 350–525 nanometer (nm) wavelength range. Suitable light sources are available and will be readily apparent to those skilled in the art in view of the present disclosure; for example, gallium nitride (GaN) based diode lasers operating at about 400 nanometers can be used. Also, auxiliary focusing and filtering means are well known to those skilled in the art and their use with the light source 12, if desired, will also be readily apparent in view of the present disclosure. The focusing means may not be needed if alignment of the first portion 14 with the light source 12 is conducted at the time of assembly. If a focusing means is desired, then one can employ a gradient index (GRIN) type of lens, as is known to those skilled in the art.

A second portion 18 of the first fiber optic cable 11 extends between the fiber optic coupler 16 and a sensor body 20. The fiber-optic cables 11, 15 should be adapted for high efficiency transmission of excitation light that is in the wavelength range of light emitted from the light source 12 and sufficiently robust for exposure at a distal end 22 to the harsh engine exhaust environment.

The sensor body 20 itself consists of a bead of porous high-temperature fluorescent inorganic oxide ceramic, preferably fused to the distal end 22 of the second portion 18. The sensor body 20 is mounted within the exhaust conduit 26, allowing it to be exposed to engine exhaust gas 24.

In certain applications, it will be desirable to provide accelerated heating of the sensor body 20 to its optimum operating temperature of 400–650° Celcius (C) more rapidly than would occur naturally following a cold start of the engine 4. In such applications, it is preferred to provide a heater for the sensor body 20, for example, an electrical resistance heater. An electrical resistance heater 28 is shown with its heating element proximate the sensor body 20 in the exhaust conduit 26. The heater 28 is connected to an electrical power source 29 of the vehicle, and can be actuated upon engine start-up by suitable automatic actuation means in accordance with devices and techniques well known to those skilled in the art for heating and maintaining a temperature.

A first portion 30 of the second fiber-optic cable 15 extends between the fiber-optic coupler 16 and a fluorescence detector 34 of the sensor assembly 10. The fluorescence detector 34 is preferably a photodiode bonded to or, alternatively formed in, the chip 13. Its purpose is to receive the optical fluorescence signal and then generate an exhaust gas oxygen content output signal 35 based thereon.

The sensor assembly 10 further includes a Bragg grating 32 for filtering out excitation light received by the first portion 30 of the second cable 15 so that it will not reach the fluorescence detector 34. The Bragg grating 32 is preferably formed integral with the third segment of fiber-optic cable 30 in order to reduce components and assure proper long term alignment. As an alternative to the Bragg grating one can employ a multi-stack dieletric interference filter, although it would add an additional component and need to be bonded onto the chip 13, and alignment concerns may more easily arise.

An excitation detector 36 is also mounted on the chip 13. This element is employed in the sensor assembly 10 in order to compensate for drift that may occur in the intensity of the excitation light from the light source 12. The detector 36 is located at the termination of a second portion 38 of the second cable 15, extending from the fiber-optic coupler 16. The excitation detector 36 can detect the level of excitation light and generate a compensation signal 37 corresponding to the intensity of the excitation light. The exhaust gas oxygen content output signal 35 can then be adjusted based on the compensation signal by a circuit 40, also mounted on the chip 13. Alternatively, instead of the circuit 40, the output signals 35 and 37 can both be transmitted to the EEC module 8, with the compensation being performed by EEC module software itself.

The operation of the sensor assembly will now be described. Excitation light, as indicated by arrows 42, is emitted from the light source 12 to the first portion 14 of the first cable 11, and carried through the second portion 18 to the sensor body 20. When the light passes through the fiber coupler 16, a small fraction of the excitation light is transferred to the second portion 38 of the second cable 15, as indicated by arrow 44, and received by the excitation detector 36. Exhaust gases 24 flow over the sensor body 20 in the direction of arrow 21. When the sensor body 20 receives the excitation light, it will emit an optical fluorescence signal responsive to oxygen content in the exhaust gas 24, upon exposure of the ceramic bead at a temperature, typically in the range of 400–650° C.

This optical fluorescence is sent back into the second portion 18 of the first cable 11, as indicated by arrows 46, with an intensity that is a function of the oxygen concentration or reductant to oxidation ratio of the exhaust gas. The optical fluorescence is then evanescently coupled, through the fiber coupler 16, into the first portion 30 of the second cable 15, as indicated by arrow 48.

Once in the first portion 30, before reaching the fluorescence detector 34, the light passes through the fiber Bragg grating 32, which serves as a rejection filter for the excitation light initially emitted from the light source 12. The fiber Bragg grating 32 has an index of refraction that varies periodically along the length of its core, with a period chosen so that the excitation light is reflected away from the fluorescence detector 34. The Bragg grating allows for the filtering function to be performed without the need for a separate optical filter.

The Excitation detector 36 senses the light intensity over time and produces the corresponding compensation signal 37. The compensation signal 37 is used to correct for fluctuations in the intensity of the light source 12. The two signals are combined by the circuit 40 to produce the oxygen signal 9, which is received by the EEC 8. The EEC 8 will then employ this signal 9, along with other inputs, to determine adjustments needed in the operating parameters of the engine 4.

While certain embodiments of the present invention have been described in detail, those familiar with the art to which this invention relates will recognize various alternative designs and embodiments for practicing the invention as defined by the following claims.

We claim:

1. An on-board gas composition sensor for an internal combustion engine, for monitoring oxygen content in an exhaust gas stream from the internal combustion engine, the gas composition sensor comprising:

a sensor body adapted for placement in an exhaust stream;

a substrate material having first and second fiber-optic mounting grooves, with the grooves formed adjacent one another at a predetermined location on the substrate to form a fiber-optic coupler;

a light source, mounted on the substrate, for generating light;

a first fiber-optic cable, having a first portion extending between the light source and the fiber-optic coupler and a second portion extending between the sensor body and the fiber optic coupler, with the first portion and a segment of the second portion mounted in the first groove;

a fluorescence detector, mounted on the substrate proximate the light source and the fiber-optic coupler, having a first signal output means;

a second fiber-optic cable, having a first portion extending between the fiber-optic coupler and the fluorescence detector; and filter means, operatively engaging the first portion of the second cable, for filtering out light generated by the light source.

2. The sensor of claim 1 further including an excitation detector, mounted on the substrate proximate the fiber-optic coupler, having a second signal output means; and a second portion of the second fiber-optic cable extending between the fiber-optic coupler and the excitation detector.

3. The sensor of claim 2 wherein the filter means is a Bragg grating, formed integrally with the first portion of the second fiber-optic cable.

4. The sensor of claim 3 further including a circuit for combining the first and the second signal output means.

5. The sensor of claim 1 wherein the filter means is a Bragg grating, formed integrally with the first portion of the second fiber-optic cable.

6. The sensor of claim 1 wherein the light source includes a means for focusing generated light into the first segment of the first fiber-optic cable.

7. The sensor of claim 1 wherein the substrate material is silicon.

8. The sensor of claim 1 wherein the sensor body is formed from a bead of porous high-temperature fluorescent inorganic oxide ceramic.

9. The sensor of claim 1 wherein the light source is a laser diode.

10. The sensor of claim 1 wherein the light source is a light-emitting diode.

11. An on-board gas composition sensor for an internal combustion engine, for monitoring oxygen content in an exhaust gas stream from the internal combustion engine, the gas composition sensor comprising:

a sensor body adapted for placement in an exhaust stream;

a substrate material having first and second fiber-optic mounting grooves, with the grooves formed adjacent one another at a predetermined location on the substrate to form a fiber-optic coupler;

a light source, deposited on the substrate, for generating coherent light;

a first fiber-optic cable, having a first portion extending between the light source and the fiber-optic coupler and a second portion extending between the sensor body and the fiber optic coupler, with the first portion and a segment of the second portion mounted in the first groove;

a fluorescence detector, mounted on the substrate proximate the light source and the fiber-optic coupler, having a first signal output means;

a second fiber-optic cable, having a first portion extending between the fiber-optic coupler and the fluorescence detector;

an excitation detector, mounted on the substrate proximate the fiber-optic coupler, having a second signal output means;

a second portion of the second fiber-optic cable extending between the fiber-optic coupler and the excitation detector; and filter means, operatively engaging the first portion of the second cable, for filtering out light generated by the light source.

12. The sensor of claim 11 wherein the filter means is a Bragg grating, formed integrally with the first portion of the second fiber-optic cable.

13. The sensor of claim 12 wherein the substrate material is silicon.

14. The sensor of claim 13 wherein the light source is a light-emitting diode.

15. An internal combustion engine for a vehicle comprising, in combination:

an internal combustion engine;

an exhaust conduit for containing an exhaust stream from the engine;

an engine controller responsive to input signals for controlling engine operation;

a sensor body suspended within the exhaust conduit; and a sensor assembly including a substrate material having first and second fiber-optic mounting grooves, with the grooves formed adjacent one another at a predetermined location on the substrate to form a fiber-optic coupler; a light source, deposited on the substrate, for generating coherent light; a first fiber-optic cable, having a first portion extending between the light source and the fiber-optic coupler and a second portion extending between the sensor body and the fiber optic coupler, with the first portion and a segment of the second portion mounted in the first groove; a fluorescence detector, mounted on the substrate proximate the light source and the fiber-optic coupler, having a first signal output means; a second fiber-optic cable, having a first portion extending between the fiber-optic coupler and the fluorescence detector; and filter means, operatively engaging the first portion of the second cable, for filtering out light generated by the light source.

16. The engine of claim 15 wherein the sensor assembly further includes an excitation detector, mounted on the substrate proximate the fiber-optic coupler, having a second signal output means; and a second portion of the second fiber-optic cable extending between the fiber-optic coupler and the excitation detector.

17. The engine of claim 16 further including a circuit for combining the first and the second signal output means.

18. The engine of claim 15 wherein the filter means is a Bragg grating, formed integrally with the first portion of the second fiber-optic cable.

19. The engine of claim 15 wherein the substrate material is silicon.

20. The engine of claim 15 further including means, mounted adjacent the sensor body, for selectively heating the sensor body.

* * * * *